UNITED STATES PATENT OFFICE.

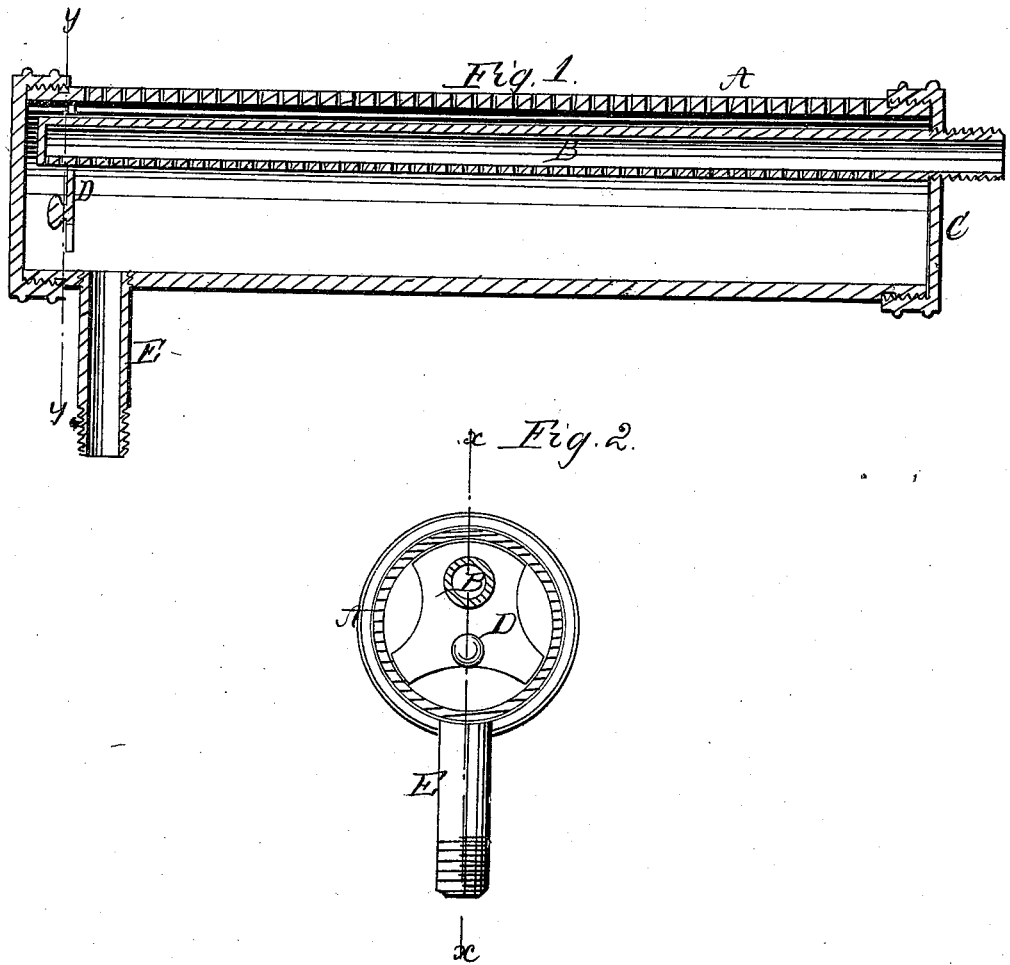

ALEXANDER WEBSTER, OF SENECA FALLS, NEW YORK.

IMPROVEMENT IN STEAM-CYLINDERS FOR FINISHING CLOTH.

Specification forming part of Letters Patent No. 70,658, dated November 5, 1867.

*To all whom it may concern:*

Be it known that I, ALEXANDER WEBSTER, of Seneca Falls, in the county of Seneca and State of New York, have invented a new and useful Improvement in Steam and Vapor Cylinders; and I do hereby declare that the following is a full, clear, and exact description thereof, which will enable those skilled in the art to make and use the same, reference being had to the accompanying drawings, forming part of this specification.

This invention relates to the steaming and dressing of woolen and other cloth; and it consists in a perforated cylinder with a perforated steam-pipe, and with suitable provision for the discharge of the water of condensation, as will be hereinafter described.

Figure 1 represents a vertical longitudinal section of my steam and vapor cylinder, showing the parts and the manner in which they are arranged, the section being through the line $x$ $x$ of Fig. 2. Fig. 2 is a cross-section of Fig. 1 through the line $y$ $y$.

Similar letters of reference indicate corresponding parts.

A represents a cylinder with caps screwed on, steam-tight, at each end, and with its upper side perforated nearly its whole length with small holes, as seen in the drawing. B is a pipe, which is connected with a steam-boiler or some steam-generating vessel, which pipe is secured in the cylinder A by being screwed through the cap C, as seen in the drawing, or in any other substantial manner.

In this example of my invention the inner end of this pipe is supported by a plate (marked D) within the cylinder. This pipe is perforated with small holes throughout its whole length, as seen in the drawing, for the escape of the steam into the cylinder A.

E is a pipe attached to the lower side of the cylinder, for the discharge of the water of condensation. This steam and vapor cylinder may be applied with great advantage to many purposes besides the dressing of woolen goods.

Having thus described my invention, what I claim as new, and desire to secure by Letters Patent, is—

The combination and arrangement of the perforated cylinder A, perforated steam-pipe B, water-pipe E, and plate D, substantially as described, for the purpose specified.

ALEXANDER WEBSTER.

Witnesses:
WM. CLARK,
DANIEL McINTOSH.